US011933230B2

United States Patent
Levisse et al.

(10) Patent No.: US 11,933,230 B2
(45) Date of Patent: Mar. 19, 2024

(54) MODULARITY OF AN AIRCRAFT TURBOMACHINE

(71) Applicant: SAFRAN AIRCRAFT ENGINES, Paris (FR)

(72) Inventors: Paul Ghislain Albert Levisse, Moissy-Cramayel (FR); Olivier Belmonte, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 18/251,278

(22) PCT Filed: Nov. 2, 2021

(86) PCT No.: PCT/FR2021/051914
§ 371 (c)(1),
(2) Date: May 1, 2023

(87) PCT Pub. No.: WO2022/096814
PCT Pub. Date: May 12, 2022

(65) Prior Publication Data
US 2023/0417192 A1    Dec. 28, 2023

(30) Foreign Application Priority Data
Nov. 4, 2020   (FR) ..................................... 2011339

(51) Int. Cl.
*F02C 7/36*      (2006.01)
*F01D 25/18*    (2006.01)
*F02C 3/06*      (2006.01)

(52) U.S. Cl.
CPC .............. *F02C 7/36* (2013.01); *F01D 25/183* (2013.01); *F02C 3/06* (2013.01);
(Continued)

(58) Field of Classification Search
CPC .. F02C 7/36; F02C 3/06; F01D 25/183; F05D 2220/323; F05D 2230/70; F05D 2240/55;
(Continued)

(56) References Cited

U.S. PATENT DOCUMENTS 3,469,868 A   9/1969 Freeman et al.
3,631,688 A   1/1972 Quick
(Continued)

FOREIGN PATENT DOCUMENTS

FR   2 975 149 A1    11/2012
WO   2015/075345 A1   5/2015

OTHER PUBLICATIONS

International Search Report dated Jan. 28, 2022, issued in corresponding International Application No. PCT/FR2021/051914, filed Nov. 2, 2021, 7 pages.
(Continued)

*Primary Examiner* — Hoang M Nguyen
(74) *Attorney, Agent, or Firm* — Christensen O'Connor Johnson Kindness PLLC

(57) ABSTRACT

An aircraft turbomachine having a longitudinal axis includes a high-pressure (HP) body, a low-pressure (LP) body, a fan, and a reduction gear having an epicyclic gear train. The turbomachine includes three modules: a first module having the LP turbine and the LP shaft, a second module having the LP compressor and a journal secured to the rotor of the LP compressor, and a third module having an input shaft of the reduction gear, this input shaft having an upstream end for coupling to a sun gear of the reduction gear and a downstream end comprising first splines that are oriented parallel to the axis and are configured to be engaged in second complementary splines of said second module.

11 Claims, 6 Drawing Sheets

(52) U.S. Cl.
CPC .... *F05D 2220/323* (2013.01); *F05D 2230/70* (2013.01); *F05D 2240/55* (2013.01); *F05D 2240/60* (2013.01); *F05D 2260/40* (2013.01); *F05D 2260/98* (2013.01)

(58) Field of Classification Search
CPC ............. F05D 2240/60; F05D 2260/40; F05D 2260/98
USPC ..................................................... 415/66–70
See application file for complete search history.

(56) References Cited

U.S. PATENT DOCUMENTS

| | | | |
|---|---|---|---|
| 3,958,887 A | | 5/1976 | Bracey et al. |
| 5,433,674 A | * | 7/1995 | Sheridan ................... F01D 5/02 |
| | | | 475/346 |
| 8,876,462 B2 | * | 11/2014 | Balk ....................... B64C 11/48 |
| | | | 415/70 |
| 10,473,035 B2 | * | 11/2019 | Brault ....................... F01D 5/02 |
| 2019/0345876 A1 | * | 11/2019 | Goumas ................... F02C 7/36 |
| 2021/0087977 A1 | * | 3/2021 | Becoulet ................... F02C 7/36 |

OTHER PUBLICATIONS

Written Opinion dated Jan. 28, 2022, issued in corresponding International Application No. PCT/FR2021/051914, filed Nov. 2, 2021, 6 pages.

* cited by examiner

MODULARITY OF AN AIRCRAFT TURBOMACHINE

TECHNICAL FIELD OF THE INVENTION

The present invention relates to solutions for facilitating the modularity of an aircraft turbomachine.

TECHNICAL BACKGROUND

The prior art includes, in particular, the documents WO-A1-2015/075345, US-A1-3,631,688, FR-A1-2,975,149, U.S. Pat. Nos. 3,958,887 and 3,469,868.

An aircraft turbomachine is often constructed as an assembly of modules, each of which may have fixed portions and moving portions. A module is defined as a sub-set of an engine that has geometric characteristics at the level of its interfaces with the adjacent modules that are sufficiently precise for it to be delivered individually, and which has been separately balanced when it comprises rotating portions. The assembly of the modules allows to build a complete engine, reducing to a minimum the balancing and matching operation of the interfacing parts.

The modularity of a turbomachine is a key element for its maintenance. Indeed, during an intervention, the parts must be easily accessible without having to dismantle a large number of portions of the engine. In practice, we try to achieve a breakdown into a few major modules. For example, for a turbomachine with an upstream fan (the terms "upstream" and "downstream" are to be understood in relation to the flow of gases in the turbomachine), we are looking for a division into three modules: a first major module for the front portion comprising the fan and the LP compressor, a second major module for the portion comprising the HP body and a third major module for the rear portion of the engine comprising the LP turbine and the LP shaft. It is thus understood that the LP body is divided into two modules.

The two modules of the LP body are fixed to each other by means of a nut that extends around the axis of the turbomachine and serves to axially clamp the fan shaft to the LP shaft.

During a maintenance operation, this nut must be unscrewed by means of a tool that is inserted into the turbomachine along its longitudinal axis, and thus inside the LP shaft and/or the fan shaft.

This maintenance is particularly difficult on a turbomachine with a reduction gear in the front or upstream portion. The problem in this case is the accessibility of the nut. The reduction gear is located upstream of the nut and must be partially removed to gain access to the nut. In addition, the access to the nut must be achieved with complex tools that present the risk of mishandling and damaging the engine.

In this case, the modularity of the first major module is lost. In addition, the second major module and the third major module must be disassembled independently.

However, the modularity of the first module is important when this module includes a reduction gear. The reduction gear is housed in a lubrication enclosure which should preferably be kept closed during maintenance to prevent oil leakage. To avoid dismantling this enclosure, there is a tendency to increase the internal diameter of the reduction gear so that it is larger than the diameter of the nut, thus allowing the nut to be removed from the inside of the reduction gear. However, this solution is detrimental to the size of the reduction gear and the overall performance of the turbomachine.

In order to improve their propulsive efficiency, the turbomachines tend to increase by-pass ratios, which generally translates into an increase in fan size (diameter and axial dimension). This makes access to the nut of the LP shaft even more complex due to the lengthening of the tool required to access it.

In addition, some turbomachines, such as those with an Unducted Single Fan (USF), are particularly long and the modules of the HP and LP bodies have very small internal diameters, which makes it difficult or impossible for the tool to access the nut.

The present invention provides a solution to at least some of the above problems that simplifies the modularity of an aircraft turbomachine.

SUMMARY OF THE INVENTION

According to a first aspect, the invention relates to a set of shafts for an aircraft turbomachine, this set comprising:
  a first shaft comprising external splines oriented parallel to an axis of rotation of the shaft,
  a second shaft comprising internal splines complementary to said external splines, this second shaft being axially engaged with the first shaft and these shafts rotating as one by engagement of their splines, and
  a system for axially locking the shafts with respect to each other,
  characterised in that said system comprises screws which are oriented radially with respect to said axis, each of these screws being screwed into a first orifice of one of the shafts and comprising a free end capable of being engaged in a second orifice of the other of the shafts, each of these screws being movable by screwing from a first radial position in which its free end is engaged in said second orifice and ensures axial locking of the shafts, and a second radial position in which its free end is disengaged from said second orifice and ensures axial unlocking of the shafts.

The set of shafts according to the invention is particularly suitable for facilitating the modularity of an aircraft turbomachine and can for example be used in the interface between two modules of an aircraft and more particularly in the interface between two shafts of these modules.

The coupling between the two shafts is made by splines. The splines run parallel to each other and are engaged by simple axial translation of the first shaft into the second shaft.

There are two types of spline couplings, the first coupling wherein the splines are free to slide axially within each other. A first disadvantage of this coupling is that the splines need to be lubricated and it is therefore necessary to have an oil sprinkler nearby. In a turbomachine with a reduction gear, the splines could be housed in the enclosure of the reduction gear for lubrication, but the disengagement of the splines during a maintenance operation would result in the enclosure being opened.

The second type of spline coupling is one in which the splines are axially locked together, and it is this technology that is used in the present invention. The advantage is that the splines do not need to be lubricated. However, an axial locking system must be provided for the shafts and thus the splines within each other.

According to the invention, this locking is provided by radial screws. In other words, the locking screws of the shafts do not run parallel to the axis but radially with respect to this axis. The screws can be evenly distributed around the axis and their number is adapted in particular according to the diameters of the shafts and the maximum torque to be transmitted between these shafts.

The set according to the invention may comprise one or more of the following characteristics, taken alone from each other, or in combination with each other:

- the first position is a radially external position, and the second position is a radially internal position;
- each of the screws comprises a radially internal end carrying a bearing head, and a radially external free end comprising a recessed cavity configured to receive a tool for screwing/unscrewing the screw;
- a ring is fixed in each of said second orifices and comprises an internal bore which has a frusto-conical segment configured to cooperate with said free end of the screw for centring the latter in said second orifice; the advantage of providing a centring ring in each second orifice is that this ring can be replaced in the event of wear by limiting the impact on the shaft;
- each ring is crimped into the corresponding second orifice;
- a socket is mounted in each of said first orifices and comprises an internal thread for screwing the corresponding screw; the advantage of providing a threaded socket in each first orifice is that this socket can be replaced in the event of wear, limiting the impact on the shaft
- each socket comprises an external annular collar for bearing on the corresponding shaft;
- a retaining shell is mounted inside the first shaft and comprises a first cylindrical rim which extends at least partly opposite said first and second orifices and which is configured to radially retain the screws when in their respective second positions;
- the collar of each socket is radially interposed between the shaft and a second cylindrical rim of the shell; and
- the shell comprises an external cylindrical centering surface configured to cooperate with an internal cylindrical surface of the first shaft, this internal cylindrical surface comprising an annular groove for mounting an annular ring of axially retaining the shell relative to the first shaft.

The present invention also relates to an aircraft turbomachine, comprising at least one set as described above.

Advantageously, said set is surrounded by at least one stator casing which comprises at least one radial orifice configured to allow the passage of a tool for screwing/unscrewing said screws.

According to another aspect, the invention relates to an aircraft turbomachine, this turbomachine having a longitudinal axis and comprising:

- a high-pressure body called HP comprising an HP shaft for connecting a HP compressor rotor to a HP turbine rotor, this HP shaft extending along said axis,
- a low-pressure body called LP comprising a LP shaft for connecting a LP compressor rotor to a LP turbine rotor, this LP shaft extending along said axis and inside the HP shaft,
- a fan connected to a fan shaft, and
- an epicyclic reduction gear connecting the LP shaft to the fan shaft, characterised in that the LP body comprises three modules:
- a first module comprising the LP turbine and the LP shaft, the LP shaft comprising a downstream end coupled to the rotor of the LP turbine,
- a second module comprising the LP compressor and a journal secured to the rotor of the LP compressor, this journal being configured to be coupled in rotation to an upstream end of the LP shaft and to be immobilised axially on this end by screwing a nut onto a thread on the shaft, and
- a third module comprising an input shaft of the reduction gear, said input shaft comprising an upstream end for coupling to a sun gear of the reduction gear and a downstream end comprising first splines which are oriented parallel to said axis and which are configured to be engaged in complementary second splines of said second module, radially oriented screws being carried by one of the second and third modules and intended to be engaged in the other of the second and third modules in order to axially lock the first and second splines in each other.

The LP body of the turbomachine is thus divided into three modules instead of two as in most previous turbomachines. The first module is a conventional one, comprising the LP turbine and the LP shaft. This LP shaft extends along the axis of the turbomachine and its downstream end is coupled to the rotor of the LP turbine.

The second module comprises the LP compressor, the rotor of which is conventionally connected to a journal. As in the prior art, this journal is engaged on the LP shaft and secured to the latter by a nut screwed on axially from upstream. This second module is coupled by splines to a third module comprising the input shaft of the reduction gear.

These splines are axially locked by radial screws. When the screws are in the unscrewed position, it is understood that the third module can be dismantled and removed from the second module.

The third module with the reduction gear can be disassembled and removed from the turbomachine before accessing the unscrewing nut of the second module from the first module. The advantage of this is that the reduction gear can have an internal diameter smaller than the diameter of the nut, which is no longer removed from the inside of the reduction gear. The locking screws of the second and third modules are radially oriented and can therefore be unscrewed by a tool oriented in the same direction, which is also not obstructed by the reduction gear.

The turbomachine according to the invention may comprise one or more of the following characteristics, taken in isolation from each other, or in combination with each other:

- the fan is of the unducted type;
- the reduction gear is located in a lubrication enclosure, said first and second splines being located outside this enclosure;
- the first and second splines are interposed axially between two annular seals of the enclosure, which are mounted between the input shaft and an annular cover of the enclosure mounted around the input shaft;
- a first of the seals, located upstream of the first and second splines, is a segmented radial seal, and a second of the segmented seals, located downstream of the first and second splines, is a labyrinth seal;
- one of the seals is interposed axially between said first and second splines on the one hand and said screws on the other hand;
- the second module comprises an upstream shaft segment comprising said second splines and mounting orifices for said screws, and a downstream shaft segment coupled or connected to said journal, said shaft segments comprising annular flanges secured together by screws oriented parallel to said axis;

the upstream shaft segment comprises a first radial annular wall the external periphery of which is connected to a first of the flanges, the downstream shaft segment comprises a second radial annular wall the external periphery of which is connected to a second of the flanges, said first and second annular walls extending opposite each other and imparting a bending deformation capability to the second module in operation; this type of connection provides flexibility to the module and is commonly referred to as a "flex coupling"; and the turbomachine comprises a stator casing which surrounds the LP and HP bodies and which comprises at least one radial orifice configured to allow the passage of a tool for screwing/unscrewing said radial screws.

The invention also relates to a method of dismantling a turbomachine as described above, characterised in that it comprises the steps of:

unscrewing the radial screws so as to axially unlock said first and second splines, retracting the third module from the second module, unscrewing the nut from inside the fan and the reduction gear, and retracting the second module from the first module.

Advantageously, the radial screws are unscrewed by means of at least one unscrewing tool which is inserted through said or each orifice of the casing.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
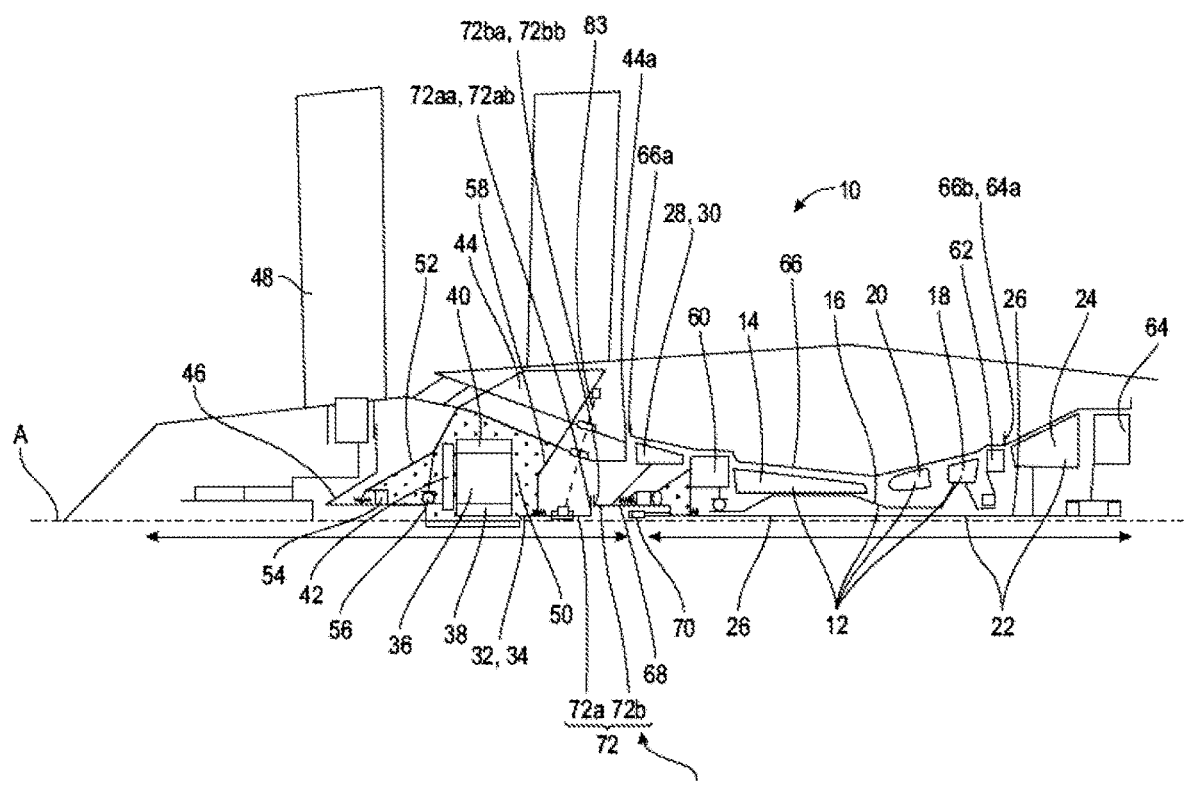
FIG. 1 is a schematic half-view in axial section of an aircraft turbomachine.

Reference is first made to FIG. 1 which illustrates an aircraft turbomachine, which in this case is an unducted single fan (USF) turbomachine 10, although the aspects of the invention are not limited to this particular type of turbomachine.

The turbomachine 10 is modular and comprises several modules assembled together. The reference A refers to the longitudinal axis of the turbomachine 10 which is generally the axis of rotation of its rotors.

A first module 12 is a high pressure or HP module and comprises an HP compressor 14 and an HP turbine 18. The rotor of the HP compressor 14 is connected by a HP shaft 16 to the rotor of the HP turbine 18. This HP module 12 further comprises the annular combustion chamber 20 which is axially interposed between the HP compressor 14 and the HP turbine 18.

The low pressure or LP body of the turbomachine 10 is itself divided into three modules:

a first module 22 comprising the LP turbine 24 and the LP shaft 26, the LP shaft comprising a downstream end coupled to the rotor of the LP turbine, a second module 28 comprising the LP compressor 30, and a third module 32 comprising the input shaft 34 of a reduction gear 36 of the turbomachine.

The turbomachine 10 is in fact equipped with an epicyclic reduction gear 36 which classically comprises a sun gear 38 centred on the axis A, a ring gear 40 which extends around the sun gear 38, and planet gears which are arranged between the sun gear and the ring gear, and which are in mesh with them and carried by a planet carrier 42. In this case, the ring gear 40 is immobile and fixed to a stator of the turbomachine, which in this case is an inlet casing 44. The sun gear 38 is mobile in rotation and coupled to the input shaft 34, and the planet carrier 42 is also mobile in rotation and coupled to a shaft 46 of the fan 48. The fan 48 is therefore driven in rotation by the input shaft 34 through the reduction gear 36.

The reduction gear 36 is located in a lubrication enclosure 50 which extends around the axis A and is therefore generally annular in shape. At its internal periphery, the enclosure 50 is delimited by the fan shaft 46 and the inlet shaft 34. At its external periphery, the enclosure 50 is delimited by the inlet casing 44 which extends around the reduction gear 36. At its upstream end, the enclosure 50 is delimited by an annular support 52 of bearings 54, 56. This support 52 has an external periphery which is attached to the inlet casing 44 and an internal periphery which holds bearing rings of the roller bearings 54, 56, internal rings of which are attached to the fan shaft 46. Finally, the enclosure 50 is closed at its downstream end by an annular cover 58 which is carried by the inlet casing 44 and the internal periphery of which surrounds the inlet shaft 34 in a sealed manner.

An intermediate casing 60 is interposed between the LP compressors 30 and HP 14, an inter-turbine casing 62 is interposed between the HP turbines 18 and LP 24, and an exhaust casing 64 is located downstream of the LP turbine 24.

The LP compressor 28 and the HP module 12 are surrounded by an annular casing 66, an upstream end of which comprises an annular flange 66a for fastening an annular flange 44a of the inlet casing 44, and a downstream end of which comprises an annular flange 66b for fastening an annular flange 64a of the exhaust casing 64.

In addition to the LP compressor 30, the second module 28 comprises a journal 68 which is rotationally secured to the rotor of the LP compressor, and which is configured to be rotationally coupled to an upstream end of the LP shaft 26 and to be axially immobilised on this end by screwing a nut 70 onto a thread of the LP shaft 26.

In the example shown, the journal 68 is engaged axially from the upstream on the upstream end of the LP shaft 26. The nut 70 is engaged axially from upstream on the upstream end of the shaft 26 and is screwed on until it axially clamps the journal 68 against an annular shoulder or the like of the shaft 26.

Although schematic, it can be seen from FIG. 1 that the nut 70 has a diameter which is greater than the internal diameter of the input shaft 34. This means that this input shaft 34 must be dismantled and removed in order to remove the nut 70.

The second module 28 further comprises a shaft 72 divided into two segments 72a, 72b respectively upstream and downstream. The shaft segments 72a, 72b are fixed to each other by clamping.

The upstream segment 72a is coupled to the input shaft 34 and comprises at its downstream end a radially external fastening flange 72aa. This flange 72aa is located at the external periphery of a radial annular wall 72ab of the downstream end of the segment 72a.

The downstream segment 72b is secured in rotation to the journal 68 and the rotor of the LP compressor 30 and comprises at its upstream end a radially external fastening flange 72ba. This flange 72ba is located at the external periphery of a radial annular wall 72bb of the upstream end of the segment 72b.

The flanges 72aa, 72ba are applied axially against each other and include axial screw mounting orifices (not visible) for fastening the flanges together. This configuration of the flanges 72aa, 72ba and the radial walls 72ab, 72bb allows for a flexible connection. This means that the shaft can withstand misalignment between the upstream and downstream portions, which is particularly interesting in the case of a relatively long engine The invention provides a solution to facilitate the modularity of the turbomachine 10 by means of a particular device for coupling the modules 28, 32 and in particular the shaft 72 of the second module 28 with the input shaft 34 of the third module 32.

FIGS. 2 to 7 illustrate an embodiment of this device in which the elements already described in the foregoing are designated by the same references.

The input shaft 34 of the module 32 is coupled to the shaft 72 of the module 28 and more specifically to the shaft segment 72a by a spline coupling 74, 76. The input shaft 34 includes adjacent its downstream end internal splines 74 which are oriented parallel to the axis A and are configured to engage on complementary external splines 76 of the shaft segment 72a.

The spline coupling 74, 76 is here of the axial locking type and this locking is ensured by screws 78 oriented in radial direction with respect to the axis A.

The screws 78 are preferably evenly distributed around the axis A. Their number is for example between 6 and 12.

Each of the screws 78 is carried by and screwed into one of the shafts 34, 72 and intended to be engaged with the other of the shafts to axially lock the splines 74, 76 into each other. It is understood that each screw 78 is mobile in the radial direction by screwing from a first radial position of axial locking of the shafts to a second radial position of axial unlocking of the shafts, and vice versa.

In the illustrated example, as best seen in FIGS. 4 to 7, each screw 78 is screwed into an orifice 80 in the shaft segment 72a and comprises a free end adapted to be engaged in an orifice 82 of the shaft 34. Each screw 78 is mobile by screwing from the first radial position, which is a radially external screwing and tightening position of the screw, to said second radial position, which is a radially internal unscrewing and loosening position.

Each screw 78 comprises a threaded body which is elongate along a radial axis with respect to axis A and has one longitudinal (radially external) end free and the opposite longitudinal (radially internal) end connected to a head 84.

The body of each screw 78 is intended to be screwed into one of the orifices 80, the head 84 of each screw is intended to rest on the shaft segment 72a in the first tightening position, and the free end of each screw is intended to be engaged in one of the orifices 82 of the shaft 34 in this first position in order to axially lock the splines 74, 76 and the shafts 34, 72.

Figure 4:
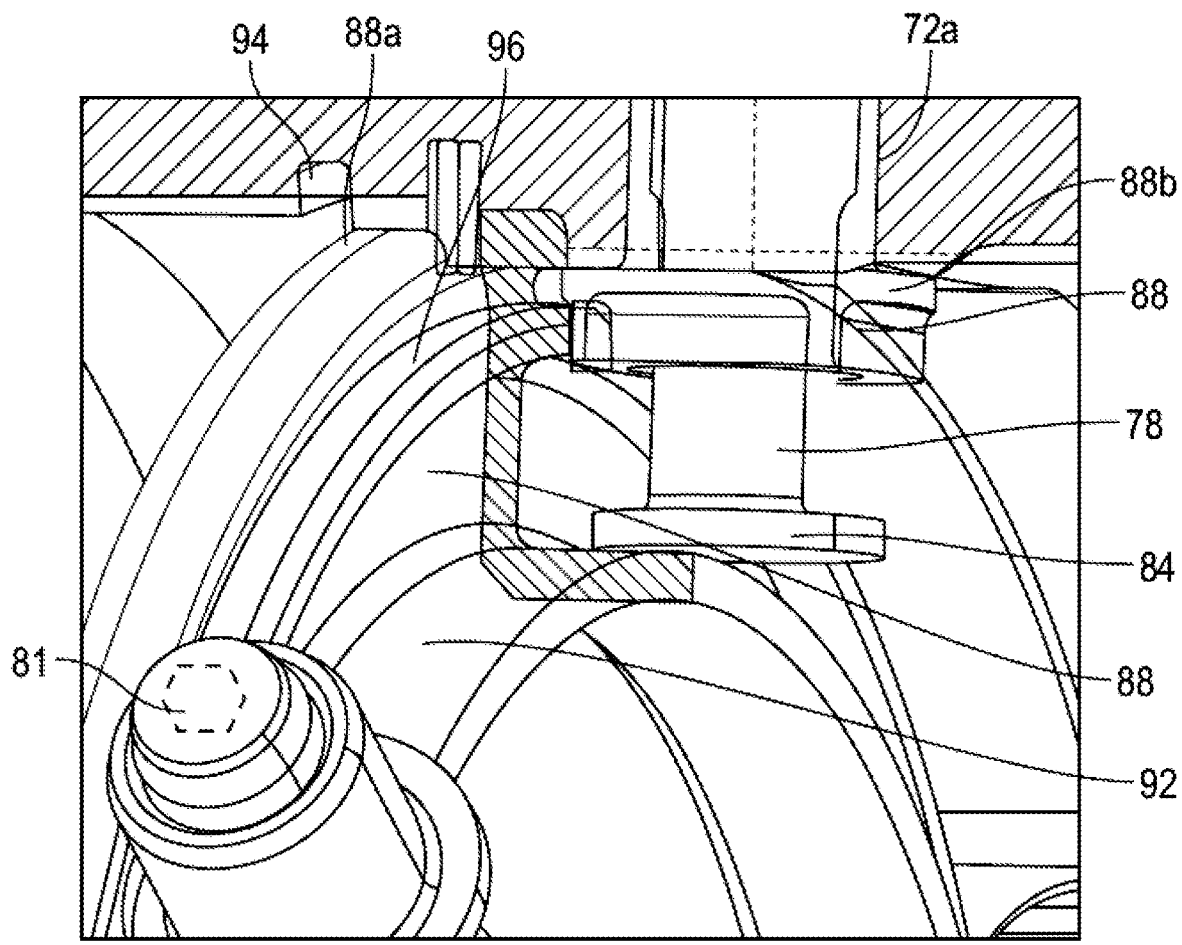
FIG. 4 is a schematic perspective view of a system for axially locking splines of the set of FIG. 2, and shows screws in an unlocked position.
Figure 7:
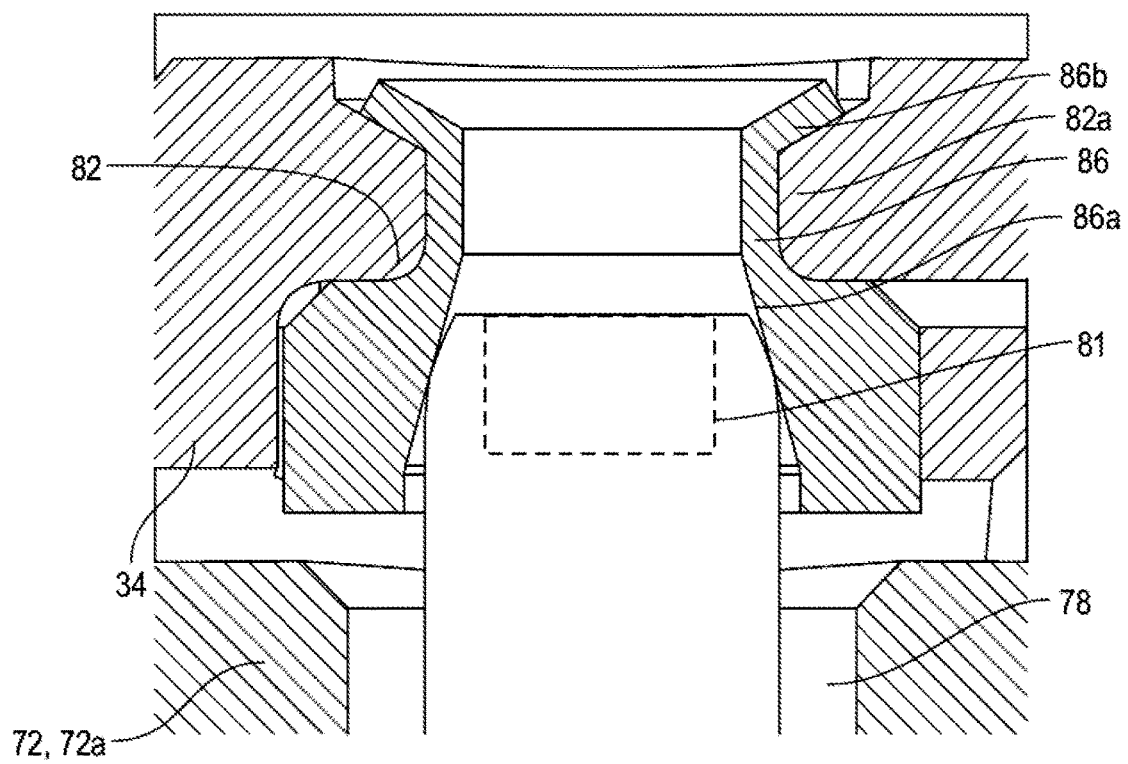
FIG. 7 is a larger scale view of a portion of FIG. 6.

Each screw 78 is rotated and screwed in by means of a tool which must also have a radial or quasi-radial orientation with respect to the axis A. According to one aspect of the invention, the screwing and unscrewing of each screw is carried out radially from the outside and not from the inside of the turbomachine. The tool must therefore have access to and be able to engage the radially external end of each screw 78. Thus, the tool is not intended to be engaged with the head 84 of each screw 78 but instead with the free end of the screw, which comprises for example a recess cavity 81, as schematically shown in FIGS. 4 and 7.

This recess 81 may have a polygonal or, for example, hexagonal cross-sectional shape so as to receive a hexagonal fitting of the tool, for example. Alternatively, it could be of the Torx® type.

Figure 2:
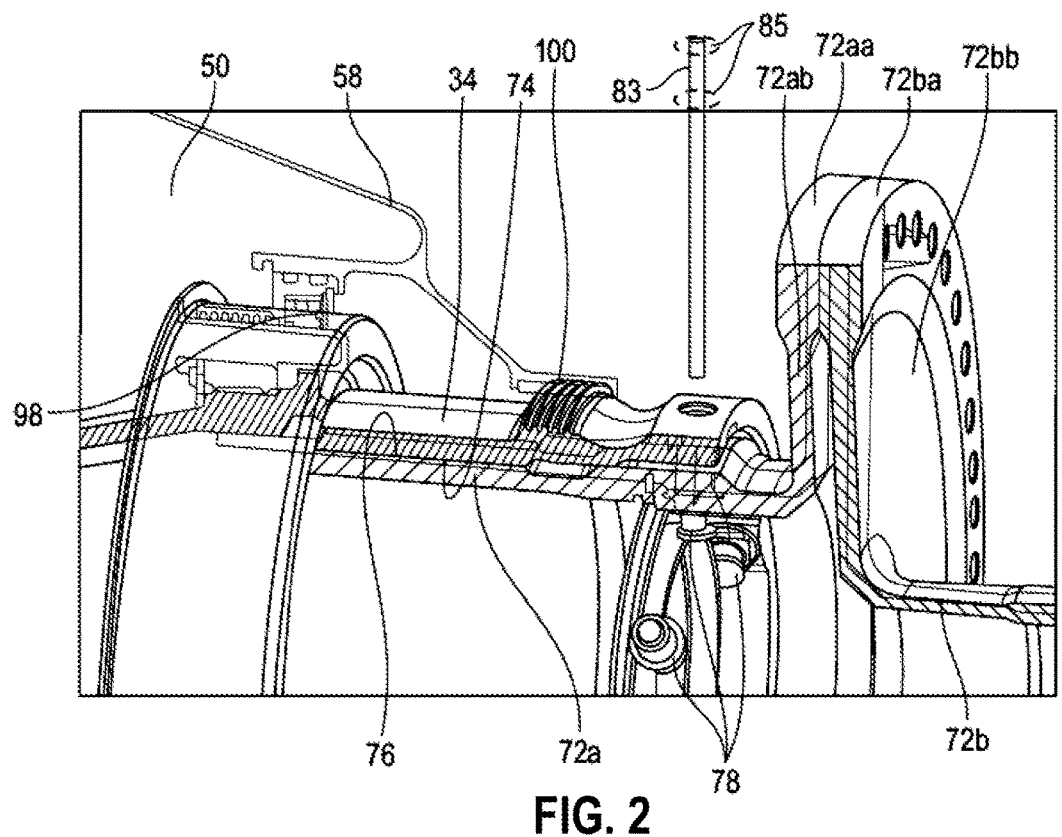
FIG. 2 is a schematic perspective view and axial section of a set of shafts in the sense of an aspect of the invention.
Figure 9:
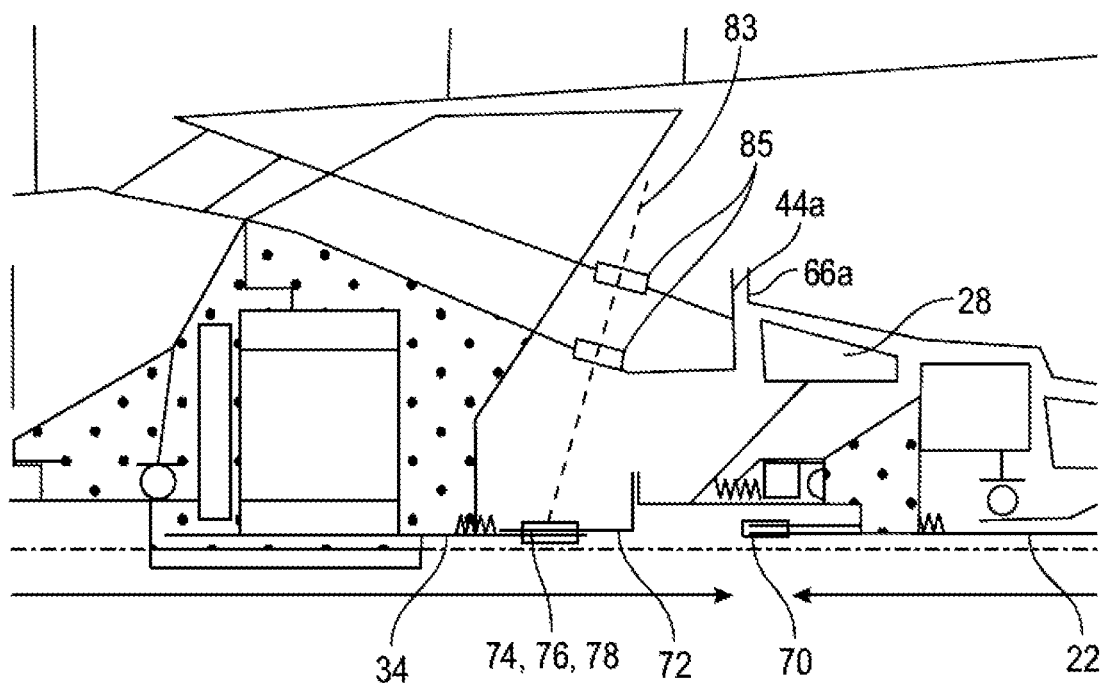
FIG. 9 is a larger scale view of a portion of FIG. 8.

A tool 83 is shown schematically in FIGS. 1, 2 and 9 for unscrewing the screws 78, as well as screwing them in. This tool 83 has an elongated shape and is engaged through one or more of the orifices 85 of the turbomachine 10. These orifices 85 may be located on stator elements of the turbomachine, such as the intermediate casing 44 or the casing 66 for example. These orifices 85 are, for example, endoscopy orifices, i.e., orifices that are generally used for endoscopic inspection of the turbomachine. Naturally, these orifices must be aligned with each other and as far as possible with the axles of the screws 78. The rotation of the shaft 34 allows access to the screws 78 one after the other through the orifices 85.

In the example shown, a ring 86 is fixed in each orifice 82 of the shaft 34. This ring 86 comprises an internal bore which has a frusto-conical segment 86a configured to cooperate with the free end of the screw 78 for centring the latter in the orifice 82. The segment 86a is flared radially towards the inside. The ring 86 is here crimped into the orifice 82 and comprises at its radially external end a peripheral rim 86b intended to be plastically deformed and pressed against an internal rim 82a of the orifice 82 (see FIG. 5 for example). It is therefore understood that the ring 86 is inserted radially from the inside into the orifice 82 and then crimped into the orifice by deformation of its rim 86b.

Furthermore, in the example shown, each screw 78 is not directly screwed into one of the orifices 80 but into a socket 88 mounted in that orifice. This socket 88 has an internal thread 88a for screwing in the screw 78 and also comprises at its radially internal end an annular collar 88b for bearing on a boss of the shaft 72 (see FIG. 5 for example).

The socket 88 may be shrink-fitted into the orifice 80 and comprise an external cylindrical surface clamped into an internal cylindrical surface of the orifice 80. The socket 88 is engaged radially from the inside into the orifice 80 until the collar 88b rests on the boss of the shaft 72. The socket 88 and the ring 86 can be changed if their thread wears out so that the whole shaft does not have to be changed.

Advantageously, a retaining shell 90 is mounted inside the shaft 72 and has the function of retaining the screws 78 and thus rendering them captive when in their unscrewed positions.

The shell 90 is annular in shape and extends around the axis A. It comprises a first cylindrical rim 92 which faces downstream and extends at least partly opposite the orifices 82 and is configured to radially retain the screws 78 when in their unscrewed positions, as illustrated in FIGS. 4 and 5.

The shell 90 preferably comprises an external cylindrical centering surface 90a configured to cooperate with an internal cylindrical surface of the shaft 72 to provide centering of the shell upon mounting. The internal cylindrical surface of the shaft 72 may comprise an annular groove 94 for mounting an annular ring (not shown) for axially retaining the shell 90 against, for example, the aforementioned boss of the shaft 72.

The shell 90 further comprises a second cylindrical rim 94 which faces downstream and extends partly around this boss. The collars 88b of the sockets 88 are radially interposed between the boss and this rim 96, which provides radial retention of the sockets in the orifices 80 and also renders them captive or radially immobile.

Figure 5:
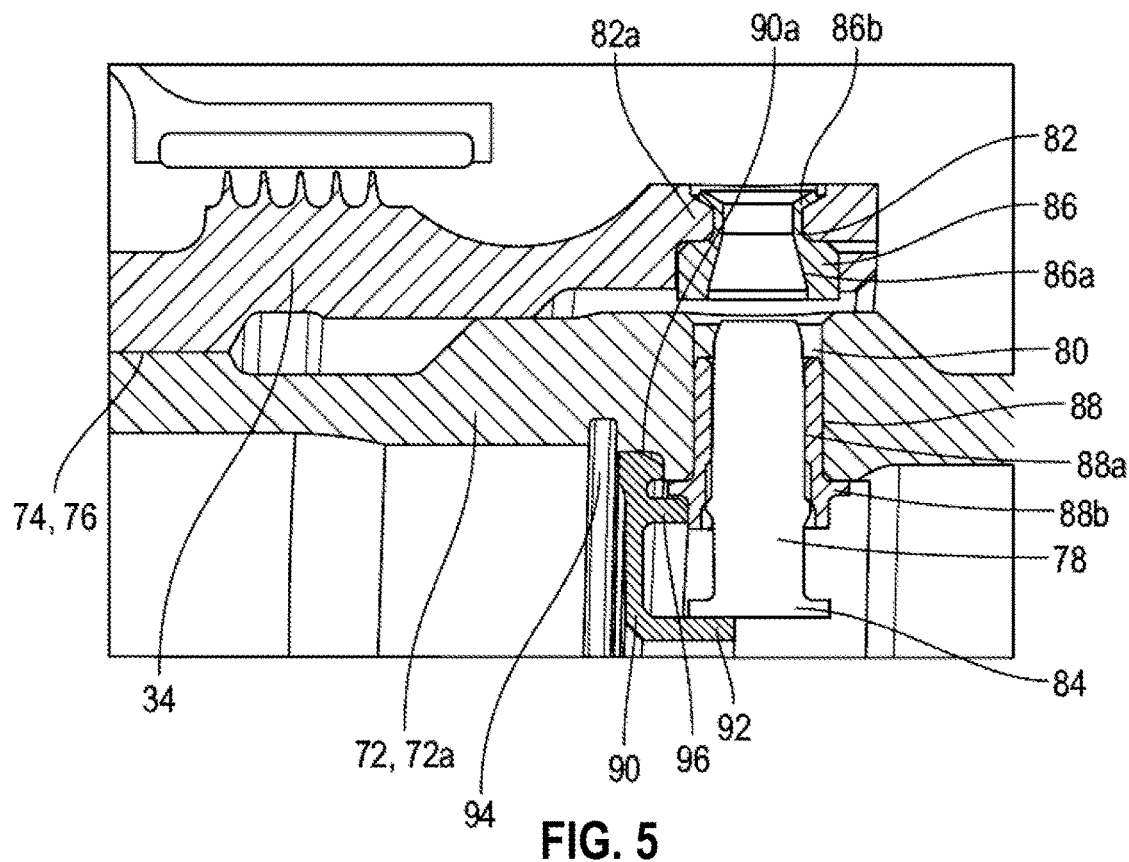
FIG. 5 is a schematic cross-section of the axial locking system with the screws in the unlocked position.

FIGS. 4 and 5 show the screws 78 in their unscrewed positions to unlock the shafts 34, 72. It can be seen that the heads 84 of the screws 78 rest radially on the rim 92 of the shell 90 and that their free ends are at a radial distance from the orifices 82. The screws 78 therefore do not interfere with the movement of the shafts 34, 72 with respect to each other and the axial disengagement of the splines 74 from each other.

Figure 6:
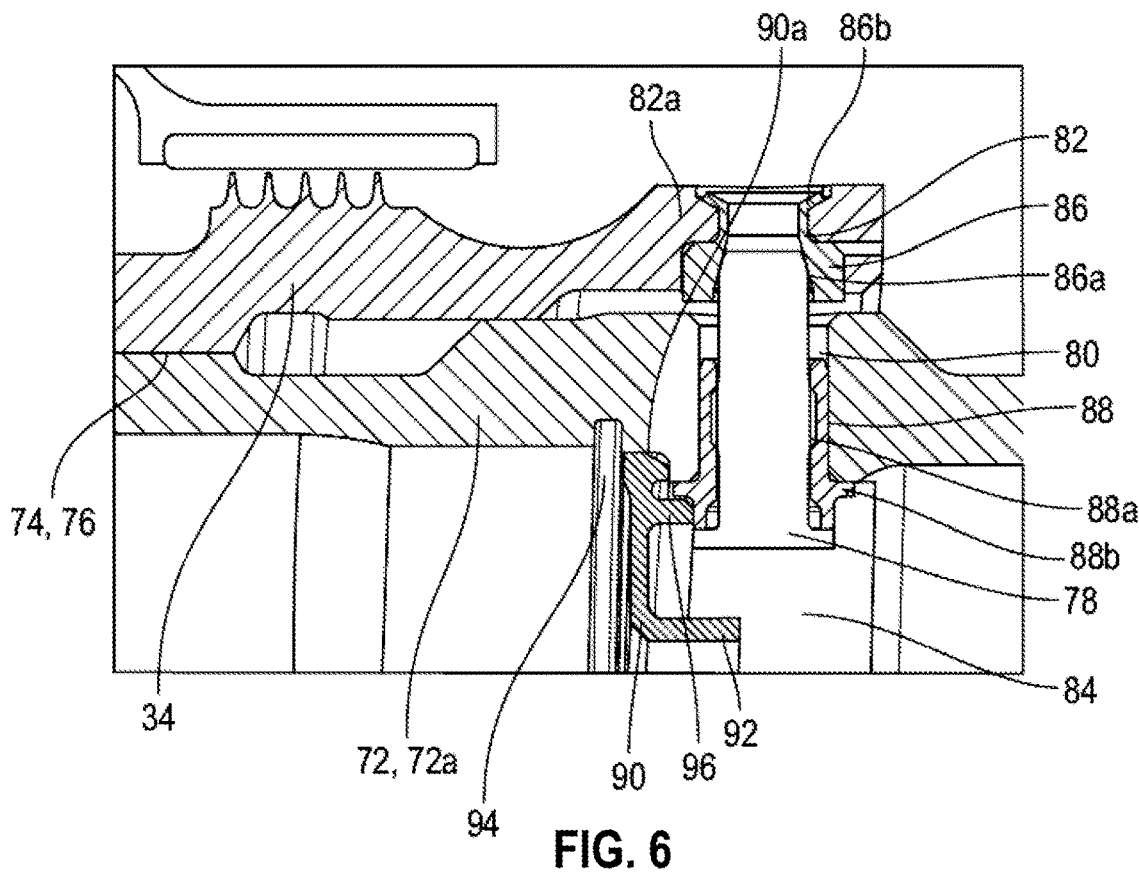
FIG. 6 is a schematic cross-section of the axial locking system with the screws in a locking position.

FIGS. 6 and 7 show the screws 78 in their screwed-in positions for axially locking the shafts 34, 72. It can be seen that the heads 84 of the screws 78 are at a radial distance from the rim 92 of the shell 90 and that their free ends are engaged in the rings 86 of the orifices 82. The screws 78 prevent the shafts 34, 72 from moving relative to each other and axially disengaging the splines 74 from each other.

Figure 3:
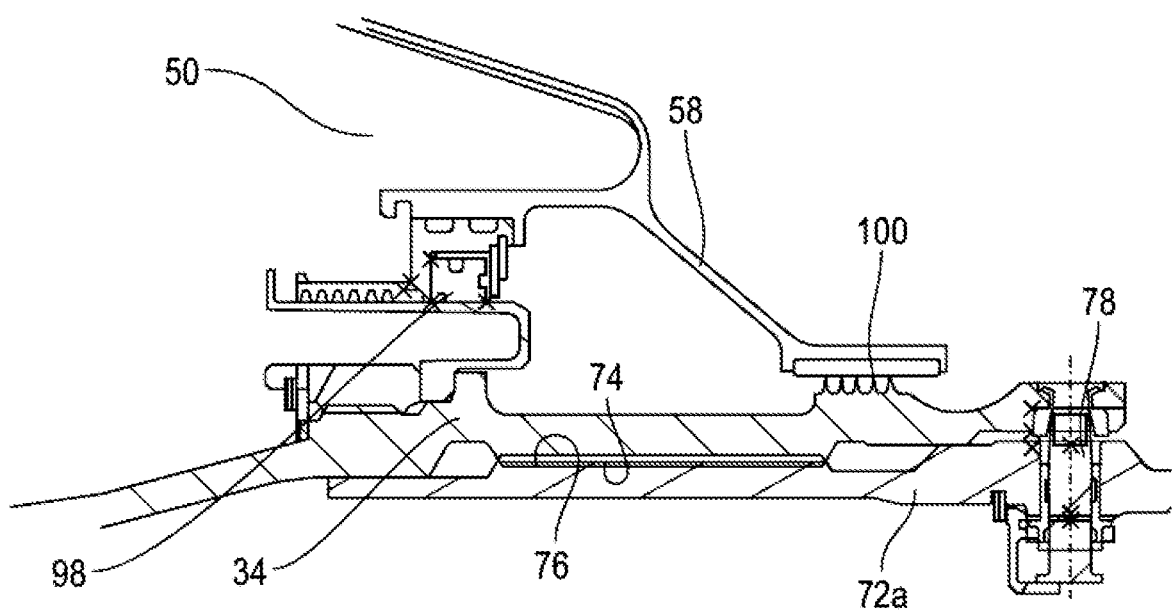
FIG. 3 is a schematic cross-section of the set shown in FIG. 2.

With regard to the splines 74, 76, FIGS. 2 and 3 in particular show that they are located outside the lubrication enclosure 50 of the reduction gear 36, and more precisely downstream from it.

In the example shown, the splines 74, 76 are located axially between two annular seals 98, 100 of the enclosure 50, namely the two seals located at the downstream end of the enclosure 50 and mounted between the cover 58 and the input shaft 34.

The seal 98 upstream of the splines 74, 76 is a segmented radial seal, and the seal 100 downstream of the splines is a labyrinth seal. The screws 78 are located downstream of the splines 74, 76 and the seals 98, 100, with the seal 100 axially interposed between the splines and the screws 78.

It can also be seen from FIGS. 2 and 3 that the diameters of the seals 98, 100, the splines 74, 76 and the screws 78 are relatively close to each other.

Reference is now made to FIGS. 8 to 10c, which illustrate steps for dismantling the turbomachine 10 of FIG. 1. It will be understood that the assembly or reassembly of the turbomachine can be used by repeating these operations in reverse order.

Figure 8:
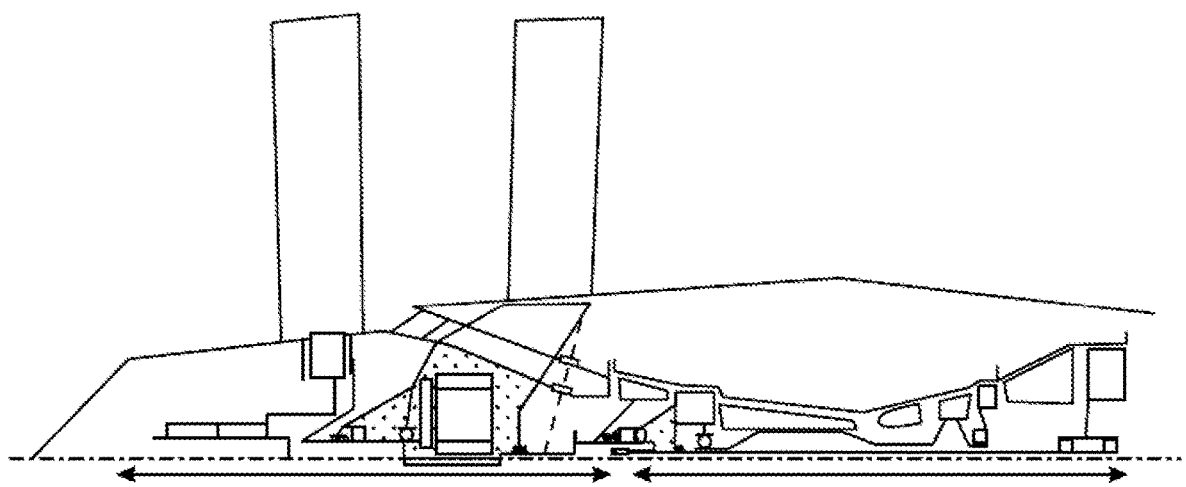
FIG. 8 is a similar view to FIG. 1 and illustrates a first step of a method according to the invention for dismantling an aircraft turbomachine.

FIG. 8 is similar to FIG. 1 and FIG. 9 is a larger scale view in which some references to the set of shafts according to the invention described above are indicated.

A first step of the method consists of inserting the tool 83 through the orifices 85 of the turbomachine 10 and then unscrewing the screws 78, one after the other, so as to bring them from their screwed positions to their unscrewed positions. This can be achieved with a single tool engaged in a single orifice 85 or in a single series of aligned orifices 85 if the shafts 34, 72 are rotated after each unscrewing so that the next screw to be unscrewed is aligned with the orifice(s) 85. Alternatively, in the event that there are as many orifices 85 or series of orifices 85 as there are screws 78, a same tool 83 could be inserted in turn into each of these orifices or series of orifices.

The screws 78 are then in the unscrewed position so the splines 74, 76 and shafts 34, 72 are free to move axially with respect to each other or to each other. This means that the third module 32 can be separated from the second module 28. To do this, it may be necessary to disengage the flanges 44a, 66a from each other. After this separation, the entire upstream portion of the turbomachine, which includes the module 28 but also the reduction gear 36, the fan 48 and the intermediate casing 44, can be removed from the rest of the turbomachine shown in FIG. 10a. It is thus understood that the enclosure 50 remains closed, which limits the risk of oil leakage.

Figure 10A:
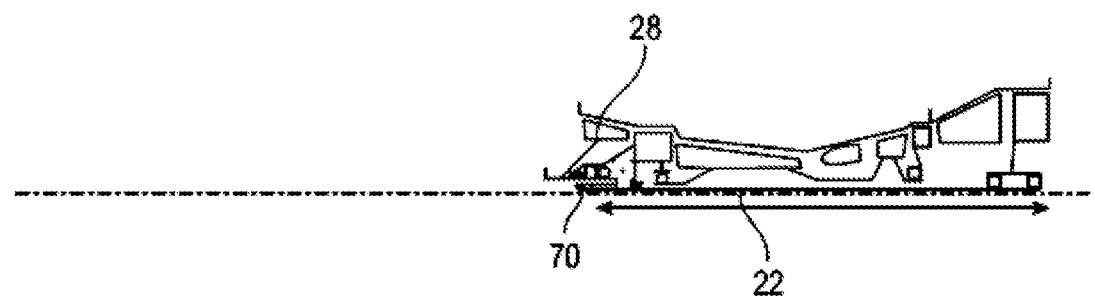
FIGS. 10a-10c are similar views to FIG. 1 and illustrate further steps in the disassembly method.
Figure 10B:
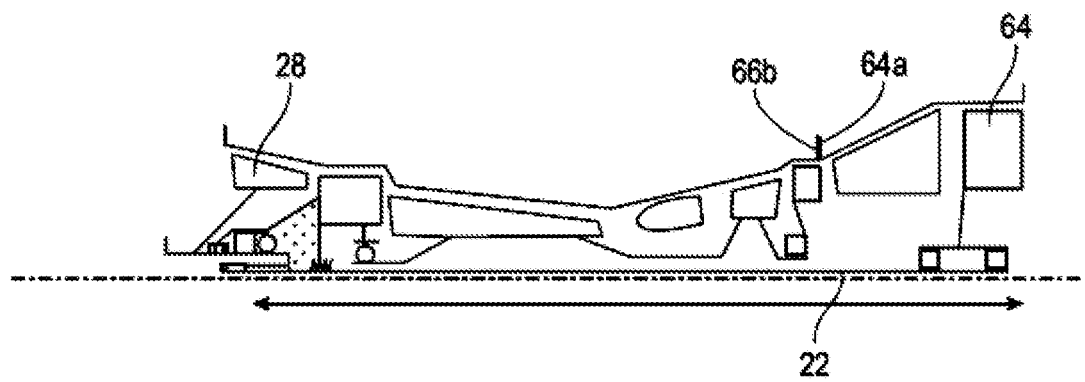

Another step in the method consists of unscrewing the nut 70 that holds the two modules 28, 22 together. It is unscrewed and removed from upstream. This gives the situation as shown in FIG. 10b.

Figure 10C:
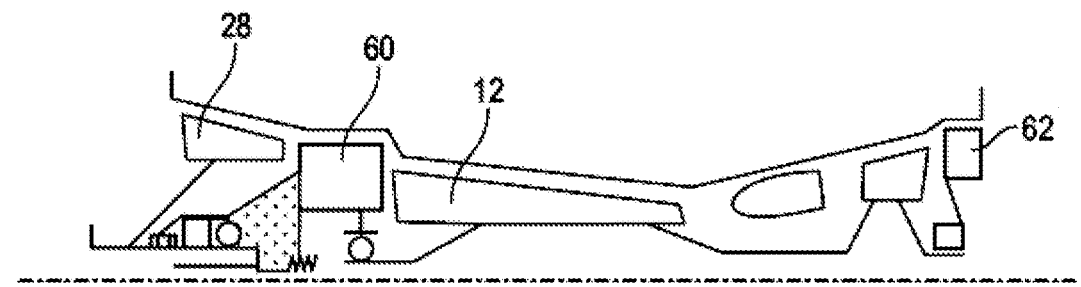

A next step in the method is to disengage the flanges 66b, 64a from each other and remove the exhaust casing 64 axially from downstream (FIG. 10c). The first module 22 can then be removed by moving it axially downstream from the second module 28 and the HP module 12 and the inter-compressor 60 and inter-turbine 62 casings.

The various modules of the turbomachine 10 are disconnected from each other and can undergo maintenance by reassembling the turbomachine.

The invention claimed is:

1. An aircraft turbomachine having a longitudinal axis, the turbomachine comprising:
    a high-pressure (HP) body comprising an HP shaft for connecting an HP compressor rotor to an HP turbine rotor, the HP shaft extending along the longitudinal axis;
    a low-pressure (LP) body comprising an LP shaft for connecting an LP compressor rotor to an LP turbine rotor, the LP shaft extending along the longitudinal axis and inside the HP shaft;
    a fan connected to a fan shaft; and
    an epicyclic reduction gear connecting the LP shaft to the fan shaft,
    wherein the LP body comprises:
    a first module comprising the LP turbine and the LP shaft, the LP shaft comprising a downstream end coupled to the rotor of the LP turbine;
    a second module comprising the LP compressor and a journal secured to the rotor of the LP compressor, the journal being configured to be coupled in rotation to an upstream end of the LP shaft and to be immobilized axially on this end by screwing a nut onto a thread on the shaft; and
    a third module comprising an input shaft of the reduction gear, the input shaft comprising an upstream end for coupling to a sun gear of the reduction gear and a downstream end comprising first splines which are oriented parallel to the longitudinal axis and which are configured to be engaged in complementary second splines of said second module, and radially oriented screws being carried by one of the second and third modules and intended to be engaged in the other of the second and third modules in order to axially lock the first and second splines in each other.

2. The turbomachine of claim 1, wherein the fan is of the unducted type.

3. The turbomachine of claim 1, wherein the reduction gear is located in a lubrication enclosure, and wherein the first and second splines are located outside of the lubrication enclosure.

4. The turbomachine of claim 3, wherein the first and second splines are interposed axially between two annular seals of the lubrication enclosure, which are mounted between the input shaft and an annular cover of the enclosure mounted around the input shaft.

5. The turbomachine of claim 4, wherein a first of the seals located upstream of the first and second splines, is a segmented radial seal, and a second of the segmented seals located downstream of the first and second splines is a labyrinth seal.

6. The turbomachine of claim 4, wherein one of the seals is interposed axially between the first and second splines, on the one hand, and the radially oriented screws, on the other hand.

7. The turbomachine of claim 1, wherein the second module comprises an upstream shaft segment comprising the second splines and orifices for mounting the radially oriented screws, and a downstream shaft segment coupled to the journal, the shaft segments comprising annular flanges secured together by screws oriented parallel to the longitudinal axis.

8. The turbomachine of claim 7, wherein the upstream shaft segment comprises a first radial annular wall, the external periphery of which is connected to a first of the flanges, wherein the downstream shaft segment comprises a second radial annular wall, the external periphery of which is connected to a second of the flanges, and wherein the first and second annular walls extend opposite each other and imparting a bending deformation capability to the second module in operation.

9. The turbomachine of claim 1, further comprising a stator casing which surrounds the LP and HP bodies and which comprises at least one radial orifice configured to allow the passage of a tool for screwing/unscrewing the radially oriented screws.

10. A method of dismantling a turbomachine according to claim 1, the method comprising:
- unscrewing the radially oriented screws to axially unlock first and second splines;
- retracting the third module from the second module;
- unscrewing the nut from inside the fan and the reduction gear; and
- retracting the second module from the first module.

11. The method of claim 10, wherein the turbomachine further comprises a stator casing surrounding the LP and HP bodies and having at least one radial orifice configured to allow the passage of a tool, wherein the method further comprises unscrewing the radially oriented screws by inserting the tool through the at least one radial orifice in the casing.

* * * * *